(12) United States Patent
Kim

(10) Patent No.: US 9,192,996 B2
(45) Date of Patent: Nov. 24, 2015

(54) WIRE GUIDE, WIRE SAW APPARATUS INCLUDING THE SAME, AND METHOD FOR SLICING INGOT USING THE SAME

(75) Inventor: Yang Sub Kim, Gumi-si (KR)

(73) Assignee: LG SILTRON INCORPORATED, Gumi-Si (KR)

( * ) Notice: Subject to any disclaimer, the term of this patent is extended or adjusted under 35 U.S.C. 154(b) by 26 days.

(21) Appl. No.: 14/367,259

(22) PCT Filed: Jan. 19, 2012

(86) PCT No.: PCT/KR2012/000486
§ 371 (c)(1),
(2), (4) Date: Jun. 20, 2014

(87) PCT Pub. No.: WO2013/094809
PCT Pub. Date: Jun. 27, 2013

(65) Prior Publication Data
US 2015/0217386 A1  Aug. 6, 2015

(30) Foreign Application Priority Data

Dec. 23, 2011 (KR) ........................ 10-2011-0141516

(51) Int. Cl.
*B23D 57/00* (2006.01)
*B28D 5/04* (2006.01)

(52) U.S. Cl.
CPC ............ *B23D 57/0053* (2013.01); *B28D 5/045* (2013.01)

(58) Field of Classification Search
CPC .. B23D 57/0053; B23D 61/185; B28D 5/045; B28D 1/08; B28D 1/124; B28D 1/088
USPC .......................................... 125/21, 16.02, 12
See application file for complete search history.

(56) References Cited

U.S. PATENT DOCUMENTS

| | | | | |
|---|---|---|---|---|
| 3,525,145 A * | 8/1970 | Bonnefoy | ............... | B28D 5/045 29/558 |
| 4,655,191 A * | 4/1987 | Wells | ................. | B23D 57/0069 125/16.01 |
| 5,564,409 A * | 10/1996 | Bonzo | ................. | B28D 5/0058 125/12 |
| 5,616,065 A * | 4/1997 | Egglhuber | ......... | B23D 57/0046 125/16.01 |
| 5,664,324 A * | 9/1997 | Hoffa | .................... | H02G 1/1256 29/33 M |
| 5,809,986 A * | 9/1998 | Katamachi | ......... | B23D 57/0053 125/16.02 |
| 5,857,454 A | 1/1999 | Shibaoka | .................... | 125/16.02 |
| 6,018,873 A * | 2/2000 | McClellan | ........... | H01B 15/006 30/90.1 |
| 6,234,159 B1 * | 5/2001 | Egglhuber | ......... | B23D 57/0023 125/16.01 |
| 6,357,433 B1 * | 3/2002 | Whalin | ............... | B23D 57/0053 125/16.01 |
| 6,941,940 B1 | 9/2005 | Zavattari et al. | ............ | 125/16.02 |
| 7,223,155 B2 * | 5/2007 | Matsumoto | ............ | B28D 5/045 125/16.02 |
| 8,146,581 B2 | 4/2012 | Kitagawa et al. | .......... | 125/16.02 |
| 2005/0217656 A1 * | 10/2005 | Bender | ................ | B28D 5/0082 125/21 |

FOREIGN PATENT DOCUMENTS

| | | |
|---|---|---|
| JP | 2010-005773 A | 1/2010 |
| JP | 2010-110865 A | 5/2010 |
| KR | 10-1997-0005473 A | 2/1997 |
| KR | 10-2003-0019409 A | 3/2003 |
| KR | 10-2011-0043544 A | 4/2011 |

OTHER PUBLICATIONS

International Search Report and Written Opinion dated Dec. 18, 2012 issued in International Application No. PCT/KR2012/000486.
Japanese Office Action issued in Application No. 2014-548639 dated Jan. 20, 2015.
Korean Office Action dated Aug. 27, 2013 issued in Application No. 10-2011-0141516.
Korean Notice of Allowance dated Feb. 26, 2014 issued in Application No. 10-2011-0141516.

* cited by examiner

*Primary Examiner* — George Nguyen
(74) *Attorney, Agent, or Firm* — Ked & Associates, LLP

(57) ABSTRACT

Disclosed is an ingot slicing wire guide around an outer face of which wires are wound. The guide has a first end and a second end opposite to the first end, and the outer face of the guide has a tilted face tilted at a predetermined angle in a direction from the first end to the second end.

20 Claims, 7 Drawing Sheets

WIRE GUIDE, WIRE SAW APPARATUS INCLUDING THE SAME, AND METHOD FOR SLICING INGOT USING THE SAME

CROSS-REFERENCE TO RELATED PATENT APPLICATIONS

This application is a U.S. National Stage Application under 35 U.S.C. §371 of PCT Application No. PCT/KR2012/000486, filed Jan. 19, 2012, which claims priority to Korean Patent Application No. 10-2011-0141516, filed Dec. 23, 2011, whose entire disclosures are hereby incorporated by reference.

TECHNICAL FIELD

The present invention relates to an ingot slicing wire guide to minimize phase changes of sliced ingot faces, a wire saw apparatus including the same and an ingot slicing method using the same.

BACKGROUND ART

A silicon wafer is widely used as a substrate for a semiconductor device.

Generally, among a series of processes to manufacture the silicon wafer, there is an ingot slicing process to slice an ingot grown with a given length by a growing process into plural pieces of single crystal silicon wafers.

There are various type methods for the ingot slicing process. Representative ingot slicing methods may include an ODS (Outer Diameter Saw) method to slice a single crystal ingot using diamond particles fixed to an outer diameter region of a thin film, an IDS (Inner Diameter Saw) method to slice a single crystal ingot using diamond particles fixed to an inner diameter region of a doughnut-shape thin film, and a WS (Wire Saw) method to slice an single crystal ingot using frictions generated between the ingot and an abrasive slurry applied to wires such as piano wires having high tensile strength while a slurry solution is being sprayed onto running wires. Among these methods, the wire saw method forms plural pieces of single crystal silicon wafers at the same time, thus being widely employed and increasing yield rates of the wafers per unit time.

FIG. 1 is a perspective view of a conventional wire saw apparatus.

The conventional wire saw apparatus, as shown in FIG. 1, includes a mounting block 110 to fix an ingot 112 using a beam 114 therebetween, wire guides 120 disposed under the ingot 112, around outer faces of which wires 122 are wound with a regular interval or pitch, and slurry supply nozzles 130 to supply a slurry 132 to the wires 122.

One surface of the beam 114 is adhered to the mounting block 110 using an organic bonding material such as epoxy therebetween. The other surface of the beam 114 is adhered to the ingot 112 using another organic bonding material therebetween. Next, by curing the two organic bonding materials, the mounting block 110, beam 114 and ingot 112 are adhered to one another.

While the mounting block 110 and thus the ingot 112 fixed thereto are loaded to the wire saw apparatus, the ingot 112 begins to be sliced.

The wires 122 are wound around the outer faces of the wire guides 120 disposed under the ingot 112 with a regular pitch. The pitch between the wires 122 may determine the number and thickness of resulting sliced wafers.

The slurry supply nozzles 130 are disposed above the wires 122 to supply the slurry 132, which contains abrasive grains, thereto. Therefore, when the ingot 112 fixed to the mounting block 110 moves and comes into pressure contact with the running wires 112, the ingot 112 is sliced by the abrasive grains applied to the running wires 112.

However, the conventional wire saw apparatus has the following downsides.

FIG. 2 is an enlarged view of the wire guide 120 of the conventional wire saw apparatus. FIG. 3 illustrates cut traces formed when slicing the ingot using the conventional wire saw apparatus.

The wire guide may be stretched or expanded by heat generated from the conventional wire saw apparatus when slicing the ingot 112. Referring to FIG. 2, the wire guide 120 may be stretched in a direction from a first proximal end 120a proximal to a support 126 to support the wire guide 120 to a second distal end 120b distant from the support 126.

Accordingly, as seen from the cut traces A to C shown in FIG. 3, as the sliced faces of the ingot 112 are located more closely to the second end 120b, the corresponding curvatures of the sliced faces, in particular, those of initially-cut portions of the sliced faces, become larger. As a result, nano-topography of a polished wafer is deteriorated.

In other words, at an initial time, the ingot 112 fixed to the mounting block 110 comes into pressure contact with the wire guide 120 around which the wires 122 are wound in a state in which the wire guide is not stretched. However, at later time, the ingot 112 comes into pressure contact with the wire guide 120 in a state where the wire guide is stretched toward the second end 120b side due to heat generated when the ingot 112 is being sliced while coming into pressure contact with the wire guide 120. Therefore, curvature of a cut trace C of the ingot 112 at the second end 102b side becomes larger.

Accordingly, there is a need to improve wafer quality by controlling expansion or stretching of the wire guide 120 so as to prevent the sliced faces of the ingot 112 from being curved.

DISCLOSURE

Technical Problem

An object of the present invention devised to solve the problem lies in providing an ingot slicing wire guide to minimize phase changes of sliced ingot faces resulting from the expansion or stretching of the wire guide by tapering the wire guide.

Another object of the present invention devised to solve the problem lies in providing a wire saw apparatus including the ingot slicing wire guide.

A further object of the present invention devised to solve the problem lies in providing an ingot slicing method using the wire saw apparatus.

Technical Solution

The object of the present invention may be achieved by providing an ingot slicing wire guide, around an outer face of which wires are wound, the guide having a first end and a second end opposite to the first end, and the outer face of the guide having a tilted face tilted at a predetermined angle in a direction from the first end to the second end.

The predetermined angle may be in a range of 0.001° to 0.025°.

The tilted face may be tilted down toward a central axis of the wire guide.

A diameter of the wire guide may gradually decrease in a direction from the first end to the second end.

The first end may be a fixed end while the second end may be a free end.

The intervals between the wires may gradually decrease in a direction from the first end to the second end.

In another aspect of the present invention, provided herein is a wire saw apparatus including a mounting block to fix an ingot using a beam therebetween, and wire guides disposed under the ingot and around outer faces of which wires are wound, each of the wire guides having a first end and a second end opposite to the first end, and the outer face of each of the wire guides having a tilted face tilted at a predetermined angle in a direction from the first end to the second end.

In a further aspect of the present invention, provided herein is an ingot slicing method including providing a wire saw apparatus including wire guides, around outer faces of which wires are wound, each of the outer faces having a tilted face, bringing an ingot to the wires in a parallel manner with a central axis of each of the wire guides, and cutting the ingot using the wires wound around the wire guides. Cutting of the ingot may occur from a wire wound around a first end of each of the wire guides being in contact with the ingot to a wire wound around a second end of each of the wire guides.

Cutting of the ingot may occur at the second end side after the wire guides stretch.

Cut traces of the ingot may be perpendicular to an axial direction of the ingot.

Advantageous Effects

In accordance with various aspects of the invention, since cutting the ingot may occur at the second end side after each of the wire guides sufficiently expands, phase changes of the sliced faces of the ingot may be minimized, thereby suppressing warpage of resulting wafers and/or improving nano-topography of the resulting wafers.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
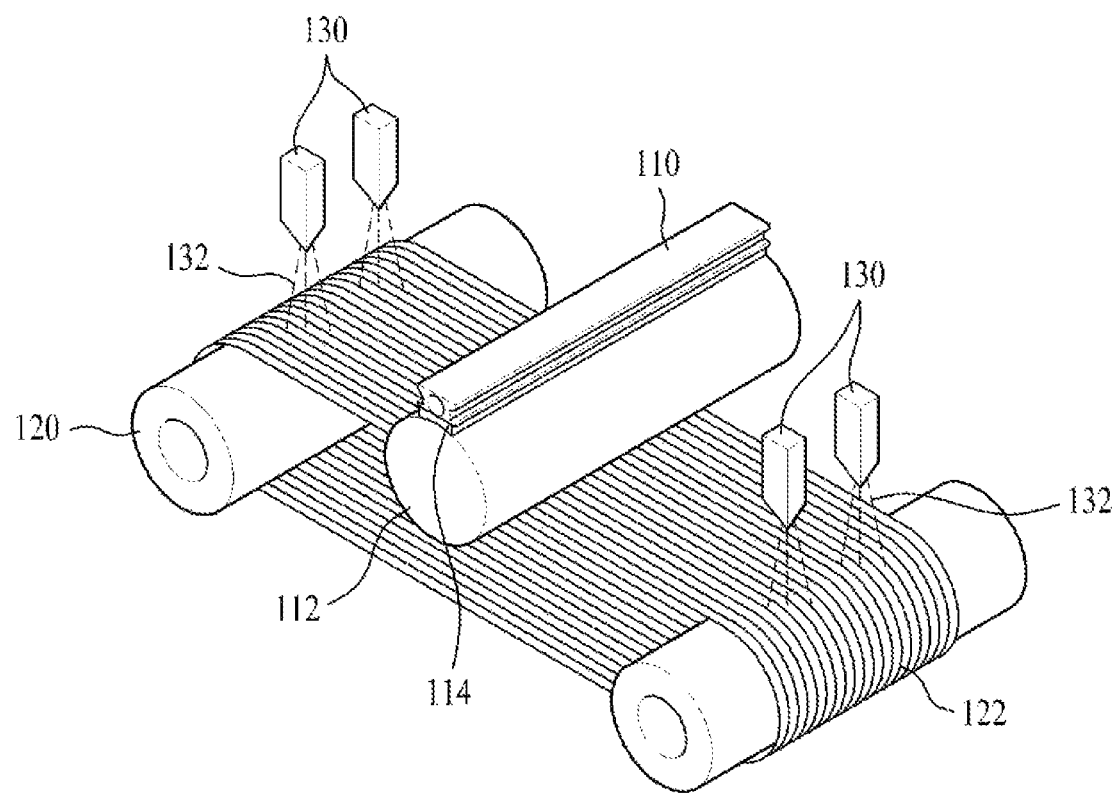
FIG. 1 is a perspective view of a conventional wire saw apparatus.
Figure 2:
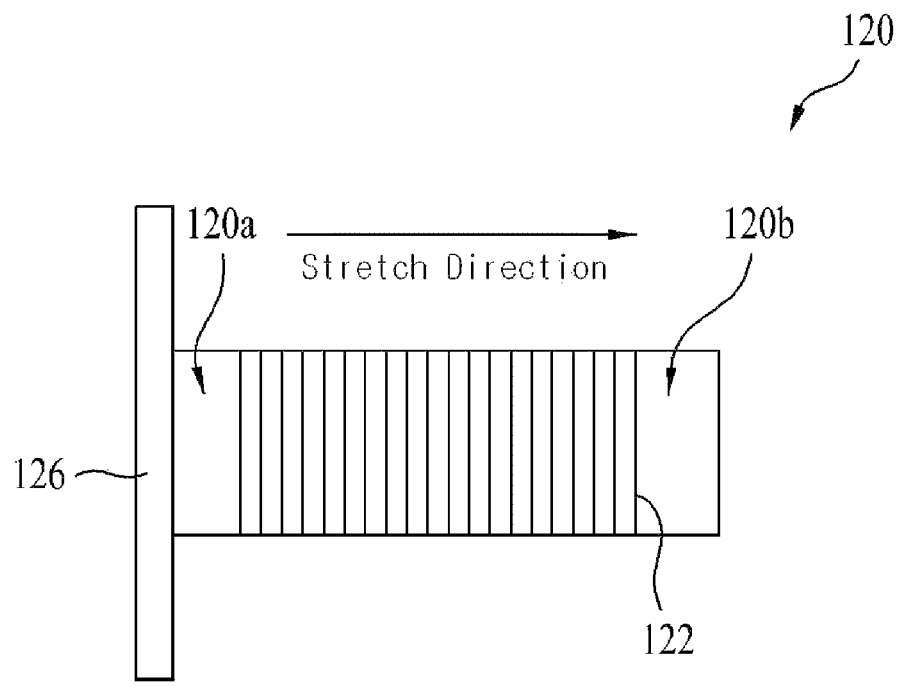
FIG. 2 is an enlarged view of a wire guide of the conventional wire saw apparatus.
Figure 3:
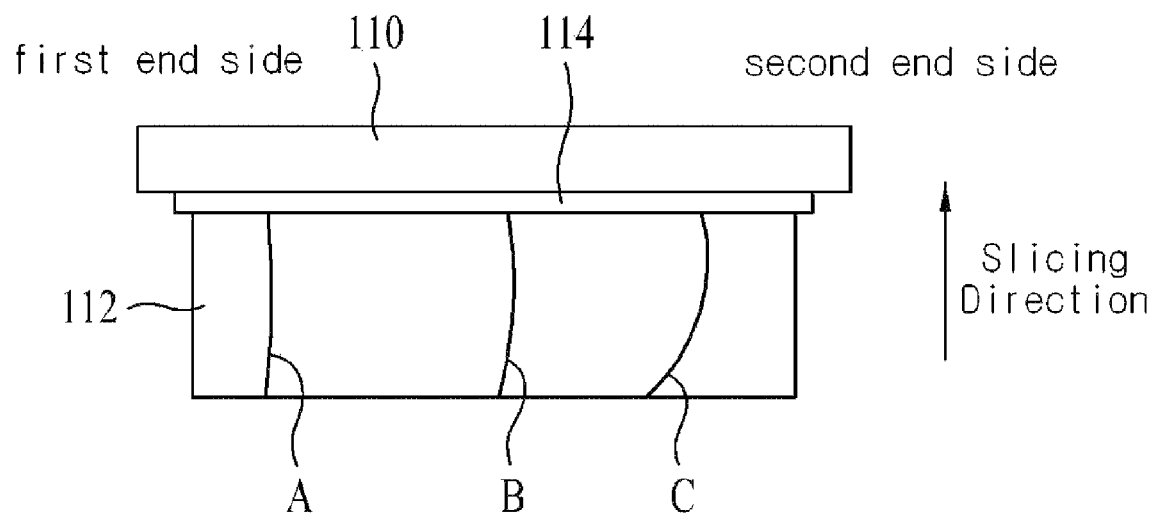
FIG. 3 illustrates cut traces formed when slicing the ingot using the conventional wire saw apparatus.

Reference will now be made in detail to the preferred embodiments of the present invention, examples of which are illustrated in the accompanying drawings. For the sake of convenience, elements identical with the above-described elements have the same names and reference numerals, and detailed descriptions thereof will be omitted.

Figure 4:
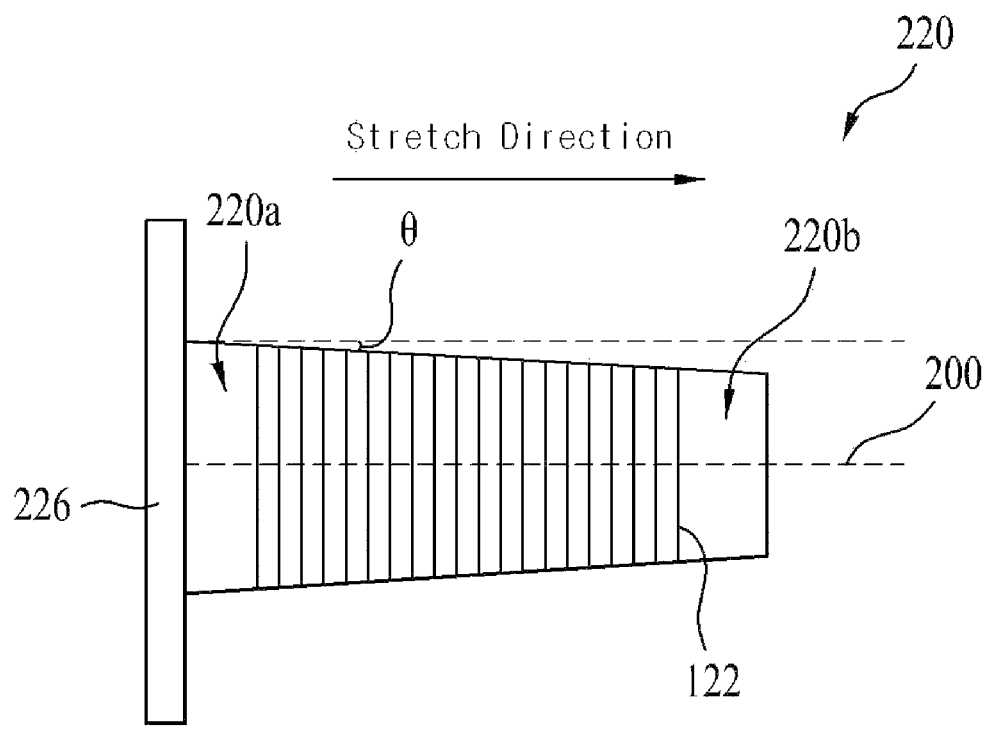
FIG. 4 illustrates an ingot slicing wire guide according to one embodiment of the invention.

FIG. 4 illustrates an ingot slicing wire guide according to one embodiment of the invention.

Around an outer face of an ingot slicing wire guide 220 according to one embodiment of the invention, wires 122 are wound. The wire guide 220 has a first end 220a and a second end 220b opposite to the first end 220a. The outer face thereof has a tilted face tilted at a predetermined angle in a direction from the first end 220a to the second end 220b.

The tilted face may be tilted at a predetermined angel toward a central axis 200 of the wire guide 220.

The first end 220a may be a fixed end fixed to a supporting member 226 to support the wire guide 220 while the second end 220b may be a free end which is not fixed to the supporting member 226.

The wire guide 220 may expand due to heat generated from a wire saw apparatus during slicing of the ingot 112. Thus, the wire guide 220 may stretch in a direction from the first end 220a as the fixed end to the second end 220b as the free end.

In accordance with one embodiment of the invention using the wire guide 220 having the tilted face tilted in a direction from the first end 220a to the second end 220b, at an initial time of the slicing process, the ingot 122 starts to be cut only at the first end 220a side of the wire guide 220 because the first end 220a side is in contact with the ingot 112 but the second end 220b side is not in contact with ingot 112 due to the tilted face of the wire guide 220. The ingot 112 comes into contact with the wires wound around the second end 220b side only after the second end 220b has expanded and stretched sufficiently, and thus the ingot 112 starts be cut at the second end 220b side. In this way, the phase changes of the sliced ingot faces may be minimized.

Figure 5:
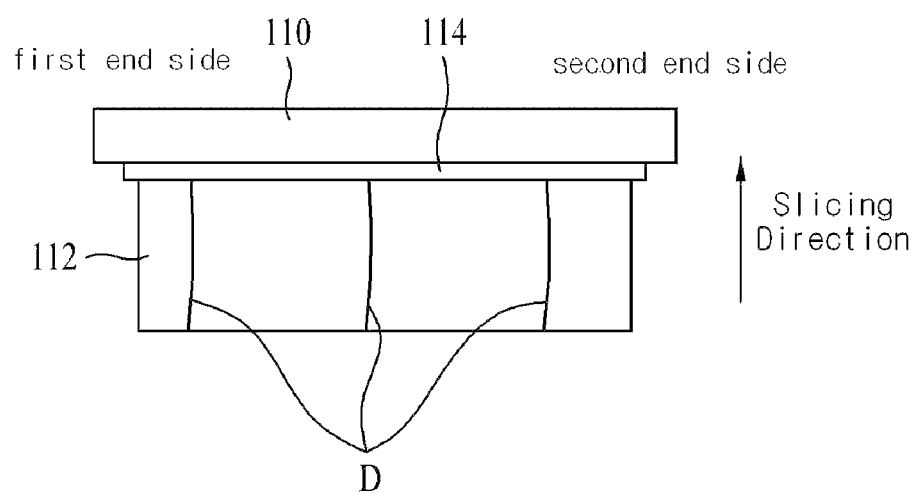
FIG. 5 illustrates cut traces formed when slicing the ingot using a wire saw apparatus including the ingot slicing wire guide according to one embodiment of the invention.

FIG. 5 illustrates cut traces formed when slicing the ingot using a wire saw apparatus including the ingot slicing wire guide according to one embodiment of the invention.

Referring to FIG. 5, the conventional approach and this embodiment of the invention will be compared with each other. In the conventional approach, at the second end 120b side, a contact point between the ingot 112 and the wire guide 120 may be displaced during the slicing process because of thermal expansion and stretch of the wire guide 120, resulting in phase changes in the sliced ingot faces. However, in accordance with this embodiment of the invention, at the second end 220b side, before sufficient thermal expansion and stretching of the wire guide 220 occurs, the ingot 112 is not in contact with the wire guide 220, whereas, the ingot 112 comes into contact with the wire guide 220 and then starts to be cut only after sufficient thermal expansion and stretching of the wire guide 220 have occurred. Therefore, at the second end 220b side, a contact point between the ingot 112 and the wire guide 220 may not be substantially displaced during the slicing process, leading to no substantial curvature of the cut traces D as shown in FIG. 5.

As mentioned above, the ingot 112 starts to be cut only after the sufficient thermal expansion and stretching of the wire guide 220 have occurred. Accordingly, in order to obtain the resulting sliced wafers with a uniform thickness, intervals between the wires wound around the wire guide 220 may gradually decreases in a direction from the first end 220a to the second end 220b.

The tilt angle θ of the tilted face tilted in a direction from the first end 220a to the second end 220b may depend on a material and associated thermal expansion coefficient of the wire guide 220, a length or thickness of the wire guide 220, etc. In one example, the tilt angle θ may be in a range of 0.001° to 0.025° with respect to a virtual line extending from the first end 220a and parallel to a central axis 200.

When the tilt angle θ of the tilted face is very small, the ingot 112 starts to be cut at the second end 220b side before the wire guide 220 has sufficiently expanded and stretched, so that the curvature of the sliced ingot faces may not be securely suppressed. On the other hand, when the tilt angle θ of the tilted face is very large, the slicing process may undesirably require a lot of time and rotation of the wire guide may be adversely affected.

Since the tilted face is tilted in a direction from the first end 220a to second end 220b, a diameter of the wire guide 220 gradually decreases in a direction from the first end 220a to the second end 220b. In other words, the wire guide 220 tapers in a direction from the first end 220a to the second end 220b.

A portion having a smaller diameter may be more sensitive to heat than another portion having a larger diameter and thus may expand and stretch more rapidly. Therefore, it may be possible to shorten the time until the wire guide 220 has sufficiently stretched at the second end 220b side having a smaller diameter.

Figure 6:
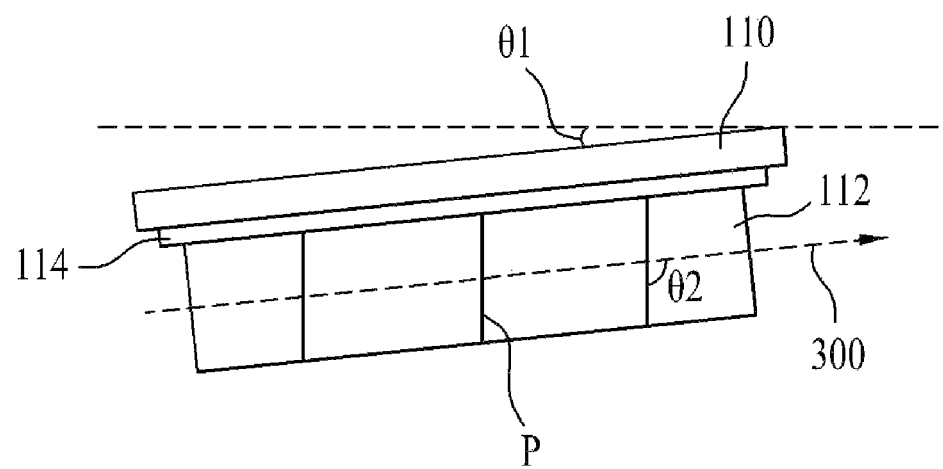
FIG. 6 illustrates cut traces formed when slicing the ingot while the ingot is disposed in a tilted manner.
Figure 6:
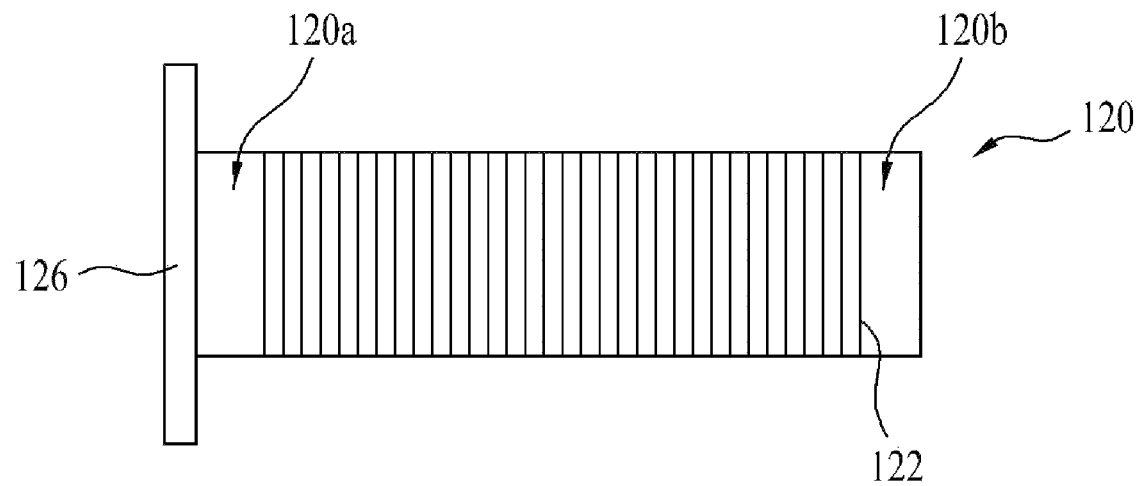
Figure 7:
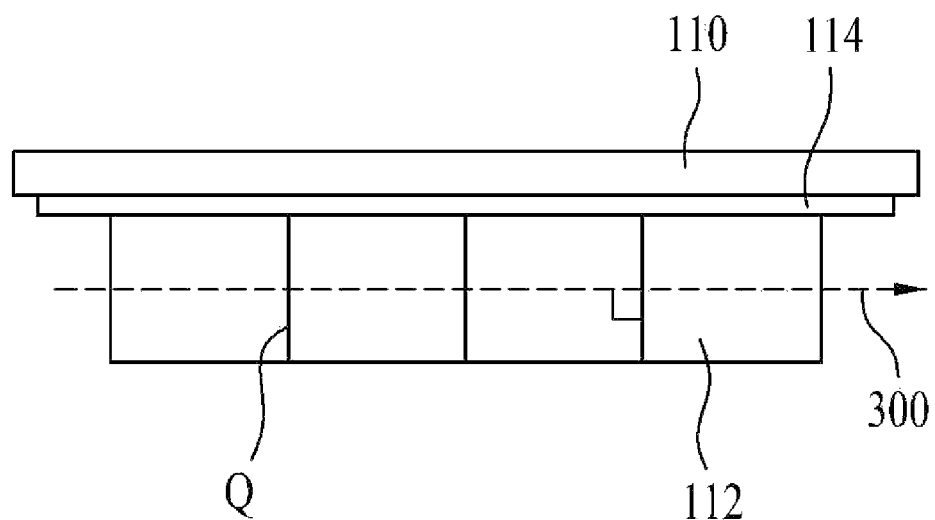
FIG. 7 illustrates cut traces formed when slicing the ingot using the ingot slicing wire guide having a tilted outer face according to one embodiment of the invention.
Figure 7:
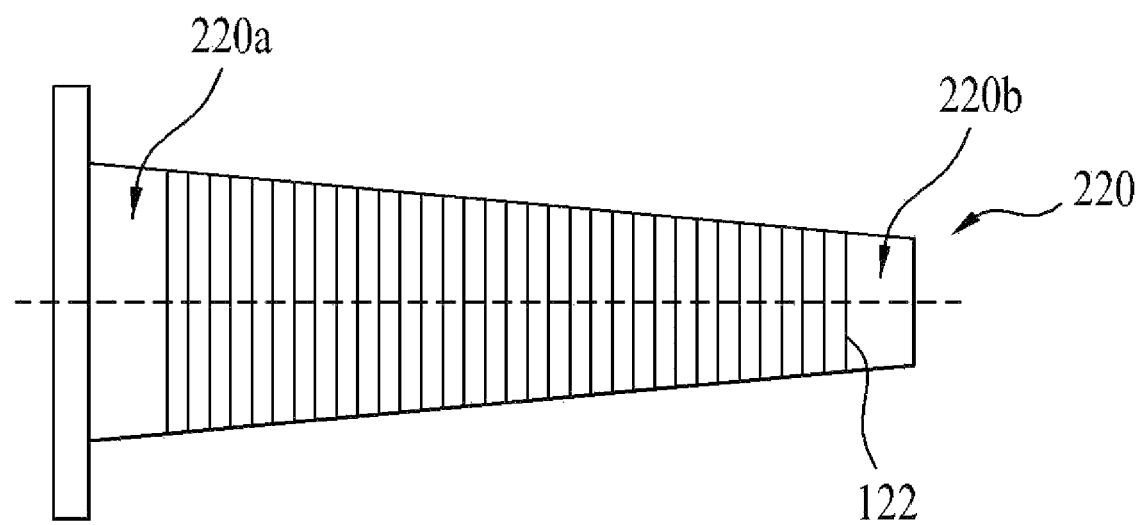

FIG. 6 illustrates cut traces formed when slicing the ingot while the ingot being disposed in the tilted manner. FIG. 7 illustrates cut traces formed when slicing the ingot using the ingot slicing wire guide having the tilted outer face according to one embodiment of the invention.

Hereinafter, referring to FIG. 6 and FIG. 7 respectively, there is provided a comparison between results respectively occurring when slicing the ingot while the ingot is disposed in the tilted manner and when slicing the ingot using the ingot slicing wire guide having the tilted outer face according to one embodiment of the invention.

Referring to FIG. 6, an outer face of the wire guide 120 does not have a tilted face unlike this embodiment of the invention, and the mounting block 110 fixing the ingot 112 using the beam 114 therebetween is disposed to be tilted at a predetermined angle θ1, so that the ingot 112 is cut while being disposed in a tilted state.

When slicing the ingot 112 while being disposed in a tilted state, the ingot 112 starts to be cut at the second end 220b side after sufficient thermal expansion and stretching of the wire guide 220 have occurred. Thus, a contact point between the ingot 112 and the wire guide 120 at the second end 120b side may not be substantially displaced during the slicing process, leading to no substantial curvature of the cut traces D as shown in FIG. 6.

However, since, as shown in FIG. 6, the ingot 112 is cut while being disposed in the tilted state, cut traces P are not perpendicular to an axial direction 300 of the ingot 112. As a result, a cut orientation of the ingot 112 may not conform to a desired cut orientation.

An angle θ2 formed between the cut traces P and the axial direction 300 of the ingot 112 is equal to a sum of 90° and the tilt angle θ1 of the ingot 112.

Further, in case when, as shown in FIG. 6, the ingot 112 is cut while being disposed in the tilted state, both end portions of the ingot 112 may not be used as a wafer and may be discarded, resulting in unnecessary loss of the ingot.

On the contrary, as shown in FIG. 7 according to one embodiment of the invention, the ingot is not disposed in the tilted state and the wire guide 220 having the tilted outer face is used and the ingot is disposed in a parallel manner with the central axis 200 of the wire guide 220.

In this way, a contact point between the ingot 112 and the wire guide 220 at the second end 220b side may not be substantially displaced during the slicing process, leading to no substantial curvature of the cut traces Q. Furthermore, the cut traces Q are perpendicular to the axial direction 300 of the ingot 112. As a result, a cut orientation of the ingot 112 may conform to the desired cut orientation, and both end portions of the ingot 112 may be effectively used as a wafer.

Figure 8:
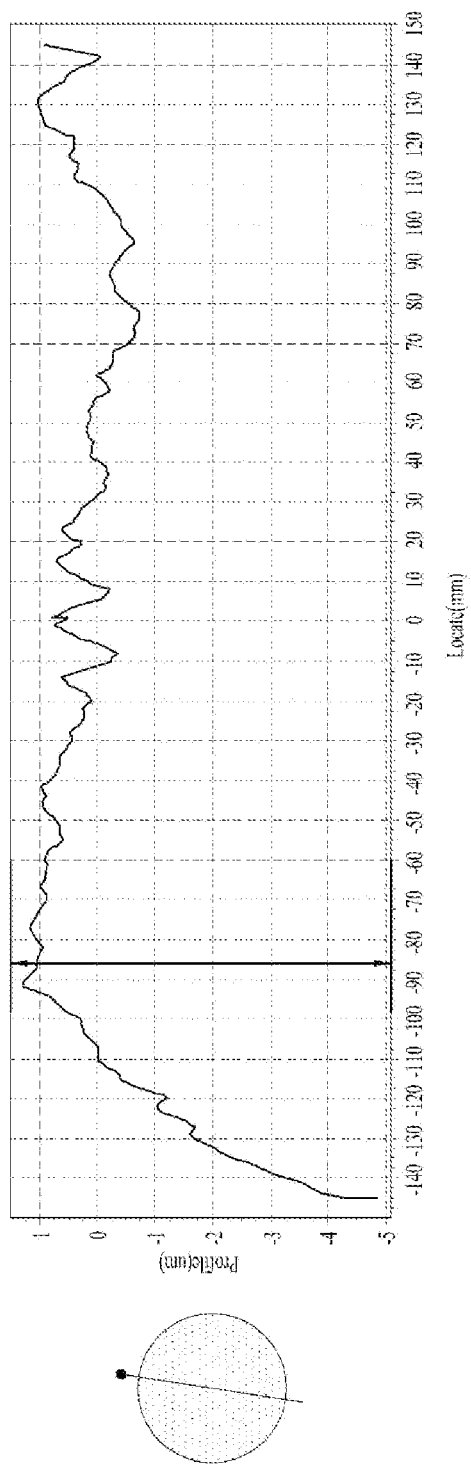
FIG. 8 illustrates a profile of sliced faces of the ingot formed when slicing the ingot using the conventional wire saw apparatus.
Figure 9:
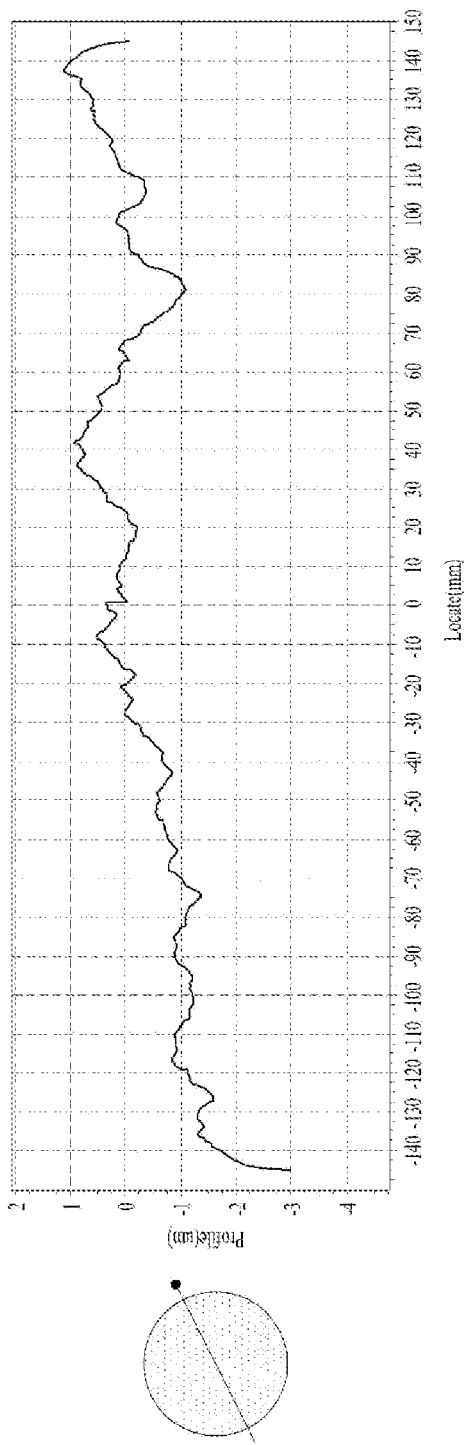
FIG. 9 illustrates a profile of sliced faces of the ingot formed when slicing the ingot using the wire saw apparatus including the ingot slicing wire guide according to one embodiment of the invention.

FIG. 8 illustrates a profile of sliced faces of the ingot formed when slicing the ingot using the conventional wire saw apparatus. FIG. 9 illustrates a profile of sliced faces of the ingot formed when slicing the ingot using the wire saw apparatus including the ingot slicing wire guide according to one embodiment of the invention.

Referring to FIG. 8, when slicing the ingot using the conventional wire saw apparatus, curvatures of initially-cut portions of the sliced faces become larger due to the thermal expansion of the wire guide.

On the contrary, referring to FIG. 9, when slicing the ingot using the wire saw apparatus including the ingot slicing wire guide according to one embodiment of the invention, curvatures of initially-cut portions of the sliced faces at the second end side are considerably reduced, thereby forming a smoother profile of the sliced ingot face at the second end side than in the conventional approach. This is because after sufficient thermal expansion and stretching of the wire guide have occurred, the ingot comes into contact with the wire guide and then starts to be cut at the second end side of the guide.

Comparisons of a warp average and nano-topography quality between resulting sliced wafers produced respectively using the conventional wire saw apparatus and the wire saw apparatus according to one embodiment of the invention are shown in the following table 1.

TABLE 1

|  | Warp average | Peak Valley (PV) |
| --- | --- | --- |
| Conventional approach | above 15 μm | 26 nm |
| embodiments of the invention | below 15 μm | 21 nm |

The warpage of the sliced wafer may be indicated as a difference between a maximum distance from a reference surface to a median surface and a minimum distance from a reference surface to the median surface. In the conventional approach, the warp average representing the warpage of the sliced wafer may be above 15 μm, whereas, in this embodiment of the invention, the warp average may be below 15 μm. Therefore, in this embodiment of the invention, it may be confirmed that the sliced faces of the ingot are even.

Moreover, with regard to the nano-topography quality of the sliced wafer, PV (peak valley) indicates a difference between maximum and minimum dimensions of steps on the wafer. In the conventional approach, PV is 26 nm, whereas, in these embodiments of the invention, PV is 21 nm. Therefore, in these embodiments of the invention, it may be confirmed that the nano-topography of the sliced wafer may be improved.

MODE FOR INVENTION

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to an ingot slicing wire guide to minimize phase changes of sliced ingot faces, a wire saw apparatus including the same and an ingot slicing method using the same. Therefore, the present invention has industrial applicability.

The invention claimed is:

1. An ingot slicing wire guide, around an outer face of which wires are wound, the wire guide having a first end and a second end opposite to the first end, wherein the outer face has a tilted face tilted at a predetermined angle in a direction from the first end to the second end.

2. The wire guide according to claim 1, wherein the predetermined angle is in a range of 0.001° to 0.025°.

3. The wire guide according to claim 1, wherein the tilted face is tilted toward a central axis of the wire guide.

4. The wire guide according to claim 1, wherein a diameter of the wire guide gradually decreases in a direction from the first end to the second end.

5. The wire guide according to claim 1, wherein the first end is a fixed end while the second end is a free end.

6. The wire guide according to claim 1, wherein intervals between the wires gradually decreases in a direction from the first end to the second end.

7. A wire saw apparatus, comprising:
a mounting block to fix an ingot using a beam therebetween; and
wire guides disposed under the ingot and around outer faces of which wires are wound,
wherein each of the wire guides has a first end and a second end opposite to the first end,
wherein the outer face of each of the wire guides has a tilted face tilted at a predetermined angle in a direction from the first end to the second end.

8. The apparatus according to claim 7, wherein the predetermined angle is in a range of 0.001° to 0.025°.

9. The apparatus according to claim 7, wherein the tilted face is tilted toward a central axis of each of the wire guides.

10. The apparatus according to claim 7, wherein a diameter of each of the wire guides gradually decreases in a direction from the first end to the second end.

11. The apparatus according to claim 7, wherein the first end is a fixed end while the second end is a free end.

12. The apparatus according to claim 7, wherein intervals between the wires gradually decreases in a direction from the first end to the second end.

13. The apparatus according to claim 7, wherein the mounting block is parallel to a central axis of each of the wire guides.

14. An ingot slicing method, comprising:
providing a wire saw apparatus comprising wire guides, around outer faces of which wires are wound, each of the outer faces having a tilted face;
bringing an ingot to the wires in a parallel manner with a central axis of each of the wire guides; and
cutting the ingot using the wires wound around the wire guides,
wherein the ingot is cut in a direction from a first end of each of the wire guides to a second end of each of the wire guides.

15. The method according to claim 14, wherein the titled face is tilted toward a central axis of each of the wire guides.

16. The method according to claim 14, wherein the titled face is tilted in a range of 0.001° to 0.025°.

17. The method according to claim 14, wherein a diameter of each of the wire guides gradually decreases in a direction from the first end to the second end.

18. The method according to claim 14, wherein an interval between the wires gradually decreases in a direction form the first end to the second end.

19. The method according to claim 14, wherein cutting the ingot occurs at the second end side after the wire guides stretch.

20. The method according to claim 14, wherein cut traces of the ingot are perpendicular to an axial direction of the ingot.

* * * * *